United States Patent
Gustafsson et al.

(10) Patent No.: US 11,578,991 B2
(45) Date of Patent: Feb. 14, 2023

(54) METHOD AND SYSTEM FOR GENERATING AND UPDATING DIGITAL MAPS

(71) Applicant: Zenuity AB, Gothenburg (SE)

(72) Inventors: Tony Gustafsson, Askim (SE); Joakim Lin Sörstedt, Gothenburg (SE)

(73) Assignee: Zenuity AB, Gothenburg (SE)

( * ) Notice: Subject to any disclaimer, the term of this patent is extended or adjusted under 35 U.S.C. 154(b) by 132 days.

(21) Appl. No.: 17/126,728

(22) Filed: Dec. 18, 2020

(65) Prior Publication Data

US 2021/0190537 A1 Jun. 24, 2021

(30) Foreign Application Priority Data

Dec. 20, 2019 (EP) ..................................... 19218793

(51) Int. Cl.
*G01C 21/00* (2006.01)
*G01S 13/89* (2006.01)
*G06V 20/56* (2022.01)

(52) U.S. Cl.
CPC ..... *G01C 21/3848* (2020.08); *G01C 21/3815* (2020.08); *G01S 13/89* (2013.01); *G06V 20/56* (2022.01)

(58) Field of Classification Search
CPC ........................ G01C 21/3848; G01C 21/3815; G01C 21/32; G01S 13/89; G01S 15/89;
(Continued)

(56) References Cited

U.S. PATENT DOCUMENTS

| 9,939,813 B2* | 4/2018 | Shashua | G05D 1/0278 |
| 2011/0161032 A1* | 6/2011 | Stahlin | G01C 21/30 |
| | | | 702/94 |

(Continued)

FOREIGN PATENT DOCUMENTS

WO 20180015811 A1 1/2018

OTHER PUBLICATIONS

Extended European Search Report dated Jul. 3, 2020 for European Patent Application No. 19218793.8, 8 pages.
(Continued)

*Primary Examiner* — Marthe Y Marc-Coleman
(74) *Attorney, Agent, or Firm* — Sage Patent Group

(57) ABSTRACT

A method and control system for generating and updating digital maps using a plurality of passages along a road portion by at least one road vehicle is provided. The method comprises obtaining positioning data and sensor data of each passage from the at least one road vehicle. Further, the method comprises forming a sub-map representation of the surrounding environment at each obtained longitudinal position based on the obtained sensor data, and estimating a longitudinal error for each obtained longitudinal position within each segment. Furthermore, the method comprises determining a new plurality of longitudinal positions of each road vehicle for each passage by applying the estimated longitudinal error on each corresponding obtained longitudinal position, and applying the determined new plurality of longitudinal positions on associated sensor data in order to generate a first layer of a map representation of the surrounding environment along the road portion.

14 Claims, 3 Drawing Sheets

(58) Field of Classification Search
CPC ........ G01S 7/003; G01S 13/865; G01S 13/86;
G01S 13/07; G01S 17/89; G06V 20/56;
G06V 10/44
See application file for complete search history.

(56) References Cited

U.S. PATENT DOCUMENTS

| | | |
|---|---|---|
| 2012/0310516 A1 | 12/2012 | Zeng |
| 2014/0379254 A1 | 12/2014 | Miksa et al. |
| 2018/0023960 A1* | 1/2018 | Fridman .............. G05D 1/0221 382/104 |

OTHER PUBLICATIONS

El-Sayed, Mohamed, et al.; "New Edge Detection Technique based on Shannon Entropy in Gray Level Images"; International Journal on Computer Science and Engineering (IJCSE); vol. 3, No. 6; Jun. 6, 2011; pp. 2224-2232 (9 pages).

* cited by examiner

METHOD AND SYSTEM FOR GENERATING AND UPDATING DIGITAL MAPS

CROSS-REFERENCE TO RELATED APPLICATIONS

The present application for patent claims priority to European Patent Office Application Ser. No. 19218793.8, entitled "METHOD AND SYSTEM FOR GENERATING AND UPDATING DIGITAL MAPS" filed on Dec. 20, 2019, assigned to the assignee hereof, and expressly incorporated herein by reference.

TECHNICAL FIELD OF THE INVENTION

The present disclosure relates to methods and systems for generating and updating digital maps, and a vehicle navigating by means of such maps. In particular, the present disclosure relates to probe-sourcing of digital maps based on a longitudinal error estimation of pose sequences.

BACKGROUND

During these last few years, the development of autonomous vehicles has exploded and many different solutions are being explored. Today, development is ongoing in both autonomous driving (AD) and advanced driver-assistance systems (ADAS), i.e., semi-autonomous driving, within a number of different technical areas within these fields. One such area is how to position the vehicle consistently and precisely since this is an important safety aspect when the vehicle is moving within traffic.

Thus, maps have become an essential component of autonomous vehicles. The question is not anymore if they are useful or not, but rather how maps should be created and maintained in an efficient and scalable way. In the future of the automotive industry, and, in particular, for autonomous drive, it is envisioned that the maps will be the input used for positioning, planning and decision-making tasks rather than human interaction.

A conventional way to solve both the mapping and the positioning problems at the same time is using Simultaneous Localization and Mapping (SLAM) techniques. However, SLAM methods do not perform very well in the real-world applications. The limitations and the noise in the sensor inputs propagate from the mapping phase to the positioning phase and vice versa, resulting in inaccurate mapping and positioning. Therefore, new accurate and sustainable solutions are needed that fulfil the requirements for precise positioning.

To this end, precise positioning maps have hitherto mainly been created by survey vehicles using high-precision equipment, particularly expensive high-precision global positioning system (GPS) sensors with centimetre-level accuracy, such as so-called real time kinematic (RTK) GPS sensors.

However, this costly process does not scale well with the increased need for continuous up-to-date maps of the environment for AD purposes as road networks are constantly changing. Thus, when maps need to be quickly and continuously updated, this approach is no longer viable.

In order to address this issue, it has been suggested to crowd-source maps through a fleet of vehicles using consumer-grade satellite positioning arrangements, such as consumer-grade GPS arrangements available in most cars. Using consumer-grade satellite positioning arrangements will however introduce uncertainty with regards to the actual position of each vehicle. This will in turn cause any maps generated and/or updated by data based on such positioning arrangements to inherit those inaccuracies.

Accordingly, there is a need for new and improved solutions, which provide more accurate, robust, and scalable means for generating and updating maps suitable for use in autonomous driving applications.

SUMMARY OF THE INVENTION

It is therefore an object of the present disclosure to provide a method for generating and updating digital maps, a control system for generating and updating digital maps, and a vehicle utilizing these maps for navigation, which alleviate all or at least some of the drawbacks of presently known solutions.

This object is achieved by means of a provide a method for generating and updating digital maps, a control system for generating and updating digital maps, and a vehicle utilizing these maps for navigation, as defined in the appended claims. The term exemplary is in the present context to be understood as serving as an instance, example or illustration.

The present disclosure is at least partly based on an insight that consumer-grade systems (such as, e.g., consumer grade GPS, IMUs, and other peripheral systems) employed in most modern vehicles today are capable of estimating in-lane offset (lateral offset in lane) and vehicle heading in a relatively accurate manner. This may for example be accomplished by using a HD-map together with standard automotive GPS and a vision-based lane-tracker. However, the "along-the-road" estimation, i.e., longitudinal position on the road, is generally difficult to estimate accurately by consumer-grade systems, and uncertainties of 10 m are not uncommon. Accordingly, the present inventors realized that by using data (positional and perception data) from several passages made by one or more vehicles, and running it through an optimization algorithm, it is possible to estimate this longitudinal error. Then, by applying the correct offset (based on the longitudinal error) to each "snap-shot" image of the surrounding environment an accurate digital maps may be generated/updated in a scalable and cost-effective manner.

According to a first aspect of the present disclosure, there is provided a method for generating and updating digital maps using a plurality of passages along a road portion by at least one road vehicle. Each road vehicle comprises a perception system having at least one sensor configured to monitor a surrounding environment of the vehicle. The method comprises obtaining positioning data and sensor data of each passage from the at least one road vehicle. The positioning data comprises a plurality of longitudinal positions of each passage within a plurality of segments of the road portion, and the sensor data comprises information about a surrounding environment of each road vehicle at each longitudinal position. Further, the method comprises forming a sub-map representation of the surrounding environment at each obtained longitudinal position based on the obtained sensor data, and estimating a longitudinal error for each obtained longitudinal position within each segment. The estimation is done by performing a numerical optimization of the longitudinal error of each obtained longitudinal position within a common segment based on a similarity level of the formed sub-map representations from the common segment. Further, the method comprises determining a new plurality of longitudinal positions of each road vehicle for each passage by applying the estimated longitudinal error on each corresponding obtained longitudinal position, and applying the determined new plurality of longitudinal positions on associated sensor data in order to generate a first layer of a map representation of the surrounding environment along the road portion.

The method provides for cost-effective and scalable means for creating and updating digital maps, and in particular HD-maps. Moreover, the longitudinal error estimation may be used to generate and update several different layers of an HD-map. For example, even if radar data or Lidar data is used to estimate the longitudinal error, the subsequent error computation may be used to accurately position for example various landmarks such as, e.g., specific road signs on the current longitudinal position along a road portion by applying the longitudinal error estimation on image data from one or more cameras of the vehicle.

Longitudinal is in the present context to be understood as "along the road" position, i.e., a position along the main extension of the road.

In some embodiments of the present disclosure, the similarity level of the formed sub-map representations within the common segment comprises an entropy function and wherein the numerical optimization is configured so to minimize the entropy function.

Moreover, in some embodiments of the present disclosure the similarity level of the formed sub-map representations within the common segment comprises a magnitude of edges within the formed sub-map representations and wherein the numerical optimization is configured so to maximize the magnitude of edges.

Further, in accordance with an exemplary embodiment of the present disclosure, the numerical optimization is further based on a (first) condition defining that a sum of longitudinal errors from the plurality of passages within the common segment is approximately zero. Accordingly, solutions of the numerical optimization in which the longitudinal errors from the plurality of passages within the common segment diverges away from zero are associated with an increasing cost factor. It is here assumed that the formed optimization problem (solved by the numerical optimization algorithm) comprises a cost function. In other words, the first condition defines that different passages from one or more vehicles typically have different longitudinal errors within the same segment, but that their average value is approximately zero.

Further, in accordance with another exemplary embodiment of the present disclosure, the numerical optimization is further based on a (second) condition defining that the longitudinal error within a single segment of one passage is (approximately/substantially) the same for all of the obtained longitudinal positions within the single segment of that passage. In other words, the second condition is based on an assumption that the deviation of the longitudinal error for one specific segment of one specific passage is approximately zero.

According to a second aspect of the present disclosure, there is provided a (non-transitory) computer-readable storage medium storing one or more programs configured to be executed by one or more processors of a processing system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present disclosure there is provided a control system for generating and updating digital maps using a plurality of passages along a road portion by at least one road vehicle. Each road vehicle comprises a perception system having at least one sensor configured to monitor a surrounding environment of the road vehicle. The control system comprises control circuitry configured to obtain positioning data and sensor data of each passage from the at least one road vehicle. The positioning data comprises a plurality of longitudinal positions of each passage within a plurality of segments of the road portion, and the sensor data comprises information about a surrounding environment of each road vehicle at each longitudinal position. The control circuitry is further configured to form a sub-map representation of the surrounding environment at each obtained longitudinal position based on the obtained sensor data, and to estimate a longitudinal error for each obtained longitudinal position. The longitudinal error is estimated within each segment by performing a numerical optimization of the longitudinal error of each obtained longitudinal position within a common segment based on a similarity level of the formed sub-map representations from the common segment. The control circuitry is further configured to determine a new plurality of longitudinal positions of each road vehicle for each passage by applying the estimated longitudinal error on each corresponding obtained longitudinal position, and apply the determined new plurality of longitudinal positions on associated sensor data in order to generate a first layer of a map representation of the surrounding environment along the road portion. With this aspect of the disclosure, similar advantages and preferred features are present as in the previously discussed first aspect of the disclosure.

Further, according to a fourth aspect of the present disclosure there is provided a vehicle comprising a perception system having at least one sensor device for generating sensor data comprising information about a surrounding environment of the vehicle and a vehicle control system comprising an automated driving module. The automated driving module has control circuitry configured to obtain map data from a control system according to any one of the embodiments of the third aspect. The map data comprises the first layer of the map representation of the surrounding environment along the road portion. The control circuitry of the automated driving module is further configured to generate a signal controlling at least one of a steering angle, an acceleration and a brake actuation in order to manoeuvre the vehicle based on a comparison between generated sensor data and the obtained map data when the vehicle is traveling along the road portion.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which.

DETAILED DESCRIPTION

Figure 1:
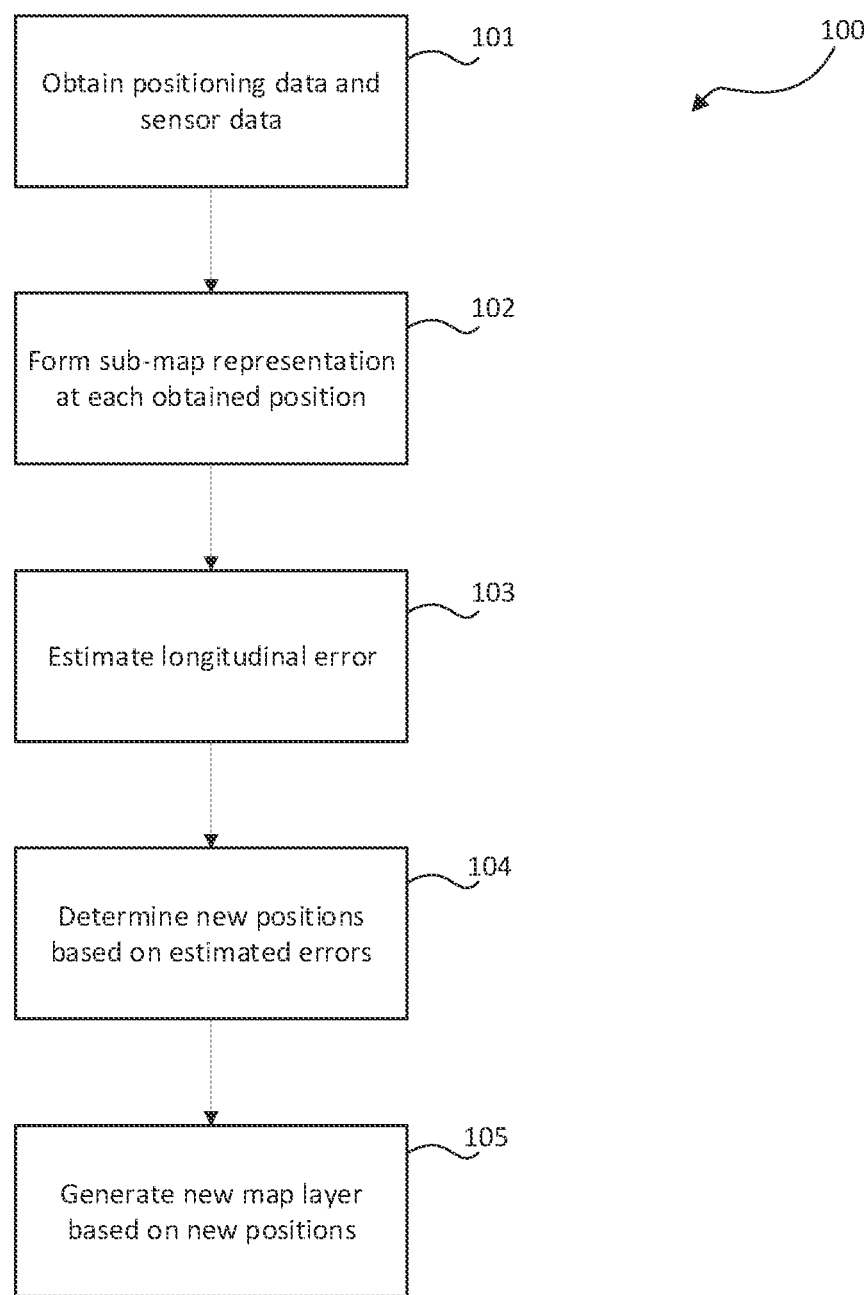
FIG. 1 is a flow chart representation of a method for generating and updating digital maps using a plurality of passages along a road portion by at least one road vehicle in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

In order to be able to build and update accurate digital maps it is crucial that the position of the probe vehicle is accurately estimated. This may be realized by using high-end localization systems provided in dedicated probe vehicles, which is a very costly and not-so-scalable processes. Alternatively, one could utilize sensor data from consumer-grade systems which will provide the necessary data output for efficient scaling, but at the cost of reduced accuracy.

Thus, present inventors realized that consumer-grade systems (such as, e.g., consumer grade GPS, IMUs, and other peripheral systems) employed in most modern vehicles today are capable of estimating in-lane offset (lateral offset in lane) and vehicle heading in a relatively accurate manner. This may for example be accomplished by using a HD-map (comprising lane markings) together with standard automotive GPS and a vision-based lane-tracker. However, the "along-the-road" estimation, i.e., longitudinal position on the road, is generally difficult to estimate accurately by consumer-grade systems, and uncertainties of 10 m are not uncommon. Accordingly, the present inventors realized that by using data (positional and perception data) from several passages made by one or more vehicles, and running it through an optimization algorithm, it is possible to estimate this longitudinal error. Then, by applying the correct offset (based on the longitudinal error) to each "snap-shot" image of the surrounding environment an accurate digital maps may be generated/updated in a scalable and cost-effective manner.

The initial estimation of the position may be performed in the vehicle, or in a system external to the vehicle (e.g., in a cloud-based service). In reference to the latter, the vehicle may send raw data (GNSS data, IMU data, sensor data, etc.) to the external service where the position/pose of the vehicle is initially estimated. This may be advantageous in order to be able to utilize "ADAS vehicles" to generate/update digital maps, as they in general are not equipped with HD maps, which increases the scalability of the herein disclosed methods and systems.

FIG. 1 is a flow chart representation of a method 100 for generating and updating digital maps using a plurality of passages along a road portion made by one or more road vehicles (e.g., cars, busses, trucks, etc.). In other words, the digital maps may be updated/generated based on one road vehicle making multiple passages along the same road portion, or multiple road vehicles making one or more passages each along the same road portion. Moreover, each vehicle is equipped with a perception system having one or more sensors for configured to monitor a surrounding environment of the vehicle. A perception system is in the present context to be understood as a system responsible for acquiring raw sensor data from on sensors such as cameras, LIDARs, RADARs, and ultrasonic sensors, and converting this raw data into scene understanding. Each road vehicle is further provided with localization systems configured to at least monitor a geographical position of the vehicle, and preferably configured to monitor a pose of the vehicle (geographical coordinates and heading).

The method 100 comprises obtaining positioning data and sensor data of each passage from the one or more road vehicles. The term obtaining is herein to be interpreted broadly and encompasses receiving, retrieving, collecting, acquiring, and so forth. The positioning data comprises a plurality of longitudinal positions ($p_x$) of each passage within a plurality of segments of the road portion. The sensor data (S) comprises information about a surrounding environment of each road vehicle at each (reported) longitudinal position ($p_x$). The positioning data may comprise additional information about the each vehicle's position. In some embodiments the positioning data comprise a plurality of poses ($P(p_y, p_x, \theta)$), i.e. a pose sequence, of each passage within a plurality of segments of the road portion, where $p_y$ denotes the lateral position on the road portion (i.e. lateral in-lane offset), $p_x$ denotes the longitudinal position on the road portion, and $\theta$ denotes the heading angle. In other words, the sensor data may be understood as a snapshot of the surrounding environment of the vehicle at each reported position along the road portion.

In some embodiments, the positional data is defined/obtained in the form of $P=(x, y, \theta)$ at each position reported by each vehicle. Furthermore, the x and y (longitudinal and lateral) position along the road portion may be projected as a trajectory. Accordingly, there is an accumulated length s at each point, i.e., $x(s)$, $y(s)$, $\theta(s)$. In such realizations, the "longitudinal position" along the road portion corresponds to an "arc-length" s, i.e., "where" the vehicle is on the estimated trajectory. In other words, it is assumed (due to the relatively high accuracy of the lateral and heading estimations) that the estimated trajectory has an accurate shape/form, but that there is an error in time/"arc-length" for each reported position. Thus, the numerical optimization may be configured to re-sample the trajectory with a longitudinal error $\delta_x$: $x(s+\delta_x)$, $y(s+\delta_x)$, $\theta(s+\delta_x)$ such that sensor data of the surrounding environment of all passages of a specific segment are at a "maximum similarity level".

The method 100 may further comprise a step of defining the plurality of segments of the road portion (not shown). The road segments may be selected/defined such that it can be assumed that the reported longitudinal error is constant over that segment. In other words, the segments are selected to be small enough to assume that the localization system of the vehicle has the same error on each report of each longitudinal position within the same segment. The selection of the length of each segment may vary depending on various factors such as, e.g., road curvature, proximity to tree line, proximity to tall buildings or other obstructing structures, presence of tunnels, quality of GNSS, if the vehicle is an AD or ADAS vehicle, and so forth. For example, if the road portion is a winding road portion (contains a large number of curves), then conventional localization algorithms are better at estimating the vehicle's longitudinal position on the road than when the vehicle is traveling on a straight highway.

Further, the method 100 forming 102 a sub-map representation of the surrounding environment at each obtained 101 longitudinal position based on the obtained 101 sensor data. In other words, a sub-map representation is formed 102 from every snapshot of the surrounding environment. In more detail, the sensor detections may be formed into a map that is quantized in space, e.g., as a grid map. Grid maps, or occupancy grid maps represents the world as divided into grids where each grid consists of a block of cells, each cell either occupied by an object with a certain likelihood or unoccupied. This likelihood can be approximated by using the amount of detections returned from an object divided by the maximum amount of possible detection returns. After post-processing raw data collected from sensors, features of interest can be mapped into corresponding grids, where each grid can be checked independently from others.

Moving on, the method 100 comprises estimating 103 a longitudinal error for each obtained longitudinal position within each segment by performing a numerical optimization of the longitudinal error of each obtained longitudinal position within a common segment based on a similarity level of the formed sub-map representations from the common segment. In more detail, the numerical optimization may be performed such that, for each segment, various longitudinal errors are applied on each sub-map representation of the plurality of sub-map representations (under one or more predefined constraints). Then, consequently some longitudinal error values will generate a "better match" of the sub-map representation within each segment than others, and the longitudinal error values for each longitudinal position associated with each sub-map representation resulting in the "best match" are selected as the correct error value.

The term similarity level is in the present context to be interpreted broadly and may for example be a level of correlation between two or more sub-maps, an entropy value, a magnitude of edges in the grouped sub-map images, a level of pixels, a level of shapes, or any other suitable means providing a quantified metric of a matching level between two or more images. In more detail, the longitudinal error estimation and optimization may be understood as a process of having two overlapping images of the same object(s) from different reference points and moving them relative to each other along a common axis and relative to a common reference point until the contents of the images are overlapping each other as good as possible. The introduced offset relative to the common reference point is in this example the longitudinal error.

Thus, in some embodiments, the similarity level of the formed sub-map representations within the common segment comprises an entropy function, and the numerical optimization is configured so to minimize or reduce the entropy function. In more detail, entropy serves as a quantified value of how well the images overlap after "pushing them" over each other in order to generate one "sharp" image of the surroundings of a segment. The entropy may be understood as a level of "sharpness" of this combined image, where a low value indicates a clear and sharp combined image and a high value is a noisy or blurred combined image.

Moreover, in some embodiments the similarity level of the formed sub-map representations within the common segment comprises a magnitude of edges within the formed sub-map representations and wherein the numerical optimization is configured to so maximize the magnitude of edges. In other words, the optimization aligns the individual images (individual formed sub-map representations) such that the combined image has as distinct and "sharp" edges (of objects or content) as possible.

Moving on, the method 100 comprises determining 104 a new plurality of positions of each road vehicle for each passage by applying the estimated longitudinal error on each corresponding obtained longitudinal position. In other words, the previously obtained 101 longitudinal positions are corrected based on the estimated 103 longitudinal errors. Then, the determined new plurality of longitudinal positions are applied on associated sensor data in order to generate 105 a first layer of a map representation of the surrounding environment along a road portion. These two steps need not be performed as two separate distinct steps, but may be executed concurrently. For example, in some embodiments the estimated longitudinal error is applied (directly) to the "associated sensor data" (which includes any meta data) whereby the layer of the map representation is generated without any distinct "determination 104" of new longitudinal positions. However, even in such embodiments where the error is applied to the associated sensor data, it is considered to include a step of "determining a new plurality of longitudinal positions".

Even though the above described embodiment focuses on the longitudinal error, i.e. $\delta_x$, in some embodiments, the method comprises additionally, or alternatively determining a lateral error $\delta_y$, and/or a heading error $\theta_x$ in analogous manner.

Executable instructions for performing these functions are, optionally, included in a non-transitory computer-readable storage medium or other computer program product configured for execution by one or more processors.

Figure 2:
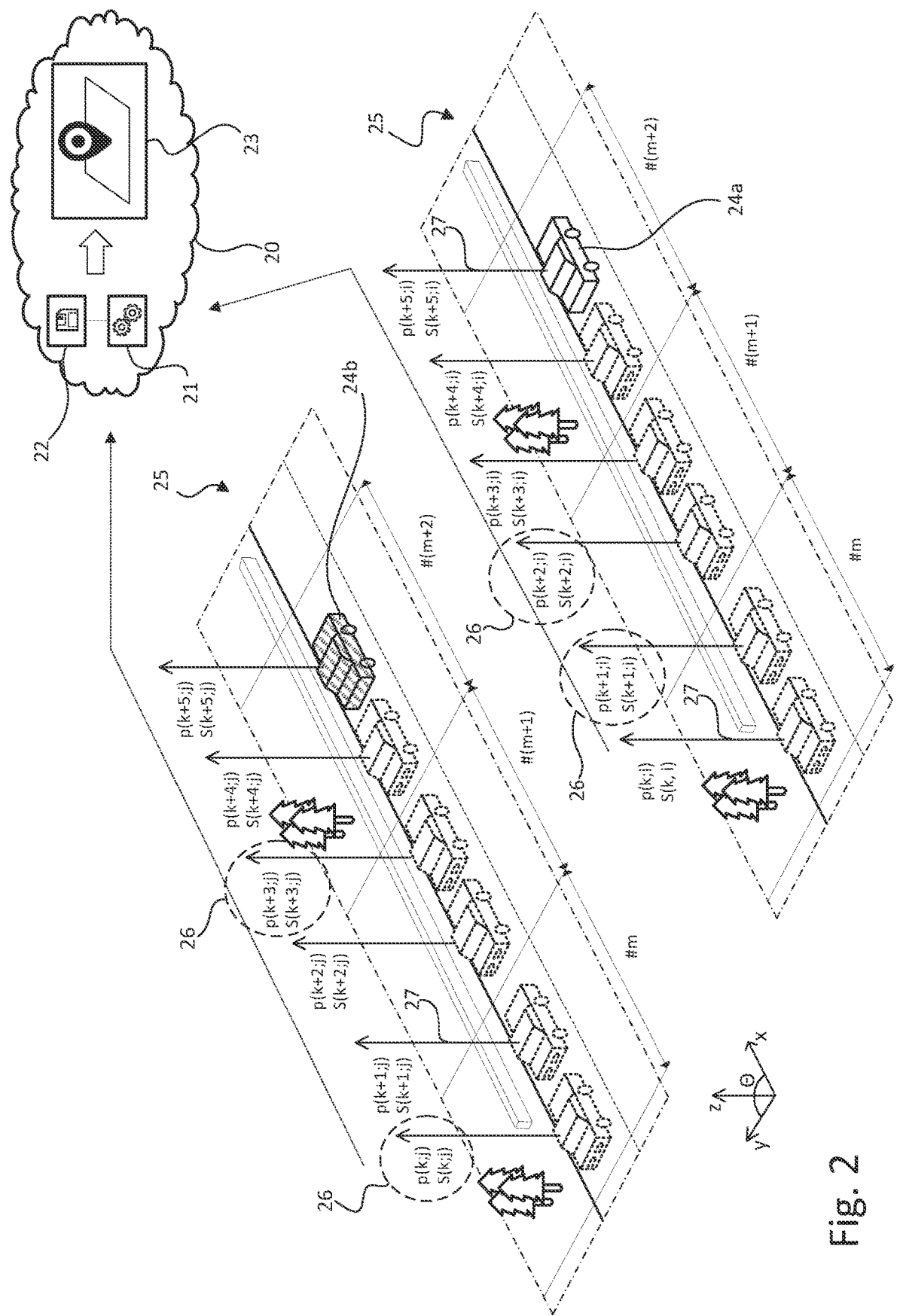
FIG. 2 is a perspective view a control system for generating and updating digital maps based on information from two vehicles traveling on the same road portion in accordance with an embodiment of the present disclosure.

FIG. 2 is a perspective view of a control system 20 for generating and updating digital maps 23 using a plurality of passages along a road portion 25 by at least one road vehicle 24a, 24b. In the illustrated example two road vehicles 24a, 24b making at least one passage each on the same road portion 25 are depicted. However, as the skilled reader readily realizes, the concepts disclosed herein are analogously applicable having one single road vehicle 24a, 24b making a plurality of passages on the same road portion 25.

Each road vehicle is equipped with a perception having one or more sensors configured to monitor a surrounding environment of the road vehicle 24a, 24b. Moreover, each vehicle is preferably equipped with a localization system for monitoring a geographical position of the vehicle, i.e., a system capable of outputting a longitudinal coordinate, a lateral coordinate and a heading direction of the vehicle 24a, 24b. The localization system may for example a consumer-grade Global Navigation Satellite System (GNSS), such as, e.g., a GPS unit. Naturally other regional GNSS solutions are equally possible such as, e.g., GLONASS, Beidou, Galileo, etc.

The control system 20 may be arranged in a remote server in communication with the vehicles 24a, 24b, as a so-called cloud-solution. The control system may comprise control circuitry 21 (may also be referred to as one or more control units, one or more processors, and so forth), and a memory 22. The memory 22 may store one or more programs configured to be executed by the control circuitry 21, the one or more programs comprising instructions for performing a method according to any one of the embodiments disclosed herein.

Further, the vehicle 1 may be connected to external network(s) via for instance a wireless link (e.g., for transmitting sensor data). The same or some other wireless link may be used to communicate with other vehicles in the vicinity of the vehicle 24a, 24b or with local infrastructure elements. Cellular communication technologies may be used for long range communication such as to external networks and external servers 20, and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g., IEEE 802.11 based solutions. ETSI is working on cellular standards for vehicle communication and for instance 5G is considered as a suitable solution due to the low latency and efficient handling of high bandwidths and communication channels. Thus, the vehicles 24a, 24b are equipped with suitable interfaces and means for communicating (not shown) with the control system 20 and vice versa.

Moving on, the control circuitry 21 is configured to obtain positioning data and sensor data of each passage from the road vehicles 24a, 24b. The positioning data comprises a plurality of longitudinal positions ($p_x$) of each passage within a plurality of segments of the road portion 25. Longitudinal is in the present context to be understood as a coordinate along the main extension of the road portion 25, i.e., along the travel direction or x-axis in the figure. The sensor data (S) comprises information about a surrounding environment of each road vehicle 24a, 24b at each (reported) longitudinal position ($p_x$). The vertical arrows 27 serve to indicate the reported positioning data of the road vehicles 24a, 24b. The positioning data may comprise additional information about the each vehicle's 24a, 24b position. In some embodiments the positioning data comprise a plurality of poses $p(p_y, p_x, \theta)$ (i.e. a pose sequence) of each passage within a plurality of segments of the road portion 25, where $p_y$ denotes the lateral position on the road portion 25, $p_x$ denotes the longitudinal position on the road portion 25, and $\theta$ denotes the heading angle. In other words, the sensor data may be understood as a snapshot of the surrounding environment of the vehicle at each reported position along the road portion 25.

In FIG. 2 three road segments #m, #(m+1), #(m+2) of the road portion 25 are illustrated. At a specific road segment, e.g., #m, it is assumed that there are $N_m$ pose sequences $\{p(k;i)\}_{i=1}^{N_m}$ where k is the sample index. The pose sequences may be understood as positioning data comprising at least a longitudinal position of the vehicle at each sample index. In FIG. 2 only two poses are illustrated in each segment for each passage, however, as is already apparent for the skilled reader the positioning data may comprise one or more longitudinal positions (or full poses) within each segment.

The sensor data comprises information about a surrounding environment of each road vehicle 24a, 24b, at each longitudinal position 27. In some embodiments, the sensor data is acquired/obtained from an active sensor system, wherein the active sensor system is arranged to transmit a signal and receive the signal reflected off objects within the surrounding environment of the road vehicle(s) 24a, 24b. The active sensor system may be at least one of a Lidar, radar, and an active sonar sensor system. An advantage of using an active sensor data, and specifically radar data, is that the subsequently generated map representation will be in the form of a radar map, which is particularly suitable for autonomous driving applications. For example, navigation based on radar data works reliably at night and in conditions of poor visibility. Moreover, radar maps can provide centimetre-level accuracy with less data as compared to camera-based maps. However, it may be hard to acquire a radar map based on radar data from a typical "surveying" vehicle as radar data is relatively noisy. Thus, several passages or vehicles are often required.

Further, the control circuitry 21 is configured to form/generate/build a sub-map representation of the surrounding environment at each obtained longitudinal position based on the obtained sensor data. Thus, in the exemplary embodiment where the sensor data comprises radar data, the control circuitry 21 is configured to form/generate/build a radar map of the surroundings at each reported longitudinal position.

Then, the control circuitry 21 is configured to estimate a longitudinal error ($\delta_x$) for each obtained longitudinal position within each segment by performing a numerical optimization of the longitudinal error of each obtained longitudinal position within the same segment based on a similarity level of the formed sub-map representations from that "same" segment.

In more detail, the numerical optimization may be based on one or more predefined assumptions. For example, as mentioned, at a certain road segment, e.g., #m, it is assumed that there are $N_m$ pose sequences $\{p(k;i)\}_{i=1}^{N_m}$ where k is the sample index. The longitudinal error $\delta(i; m)$ is defined as the error along the i:th pose path (i.e., a pose path of the first vehicle 24a) for segment #m. Moreover, one may assume that other errors (such as wrong lane assignment by a localization algorithm, lateral error, heading error) are negligible in comparison to the longitudinal error.

Furthermore, it assumed that the longitudinal error for a plurality of passages (made by one or several vehicles 24a, 24b) within each segment is approximately zero, i.e., $\sum_{i=1}^{N_m} \delta_x(i; m) \approx 0$. Also, the road segments are preferably selected such that it can be assumed that $\delta_x(i; m)$ is constant over that segment. In other words, the segments are selected to be small enough to assume that the GNSS of the vehicle 24a, 24b has the same error on each report of each longitudinal position within the same segment. The selection of the length of each segment may vary depending on various factors such as, e.g., road curvature, proximity to tree line, proximity to tall buildings or other obstructing structures, presence of tunnels, quality of GNSS, if the vehicle is an AD or ADAS vehicle, and so forth. For example, if the road portion is a winding road portion (contains a large number of curves), then conventional localization algorithms are better at estimating the vehicle's longitudinal position on the road than when the vehicle is traveling on a straight highway.

Further, in order to eliminate the longitudinal error $\delta_x$ from the associated sensor data for the sub-sequent map generation, cloud-processing may be applied. Accordingly, the goal of the error estimation step is to estimate $\delta_{x_m} = [\delta_x(i; m), \ldots, \delta_x(N_m; m)]^T$.

In some embodiments, in order to estimate the longitudinal error for all pose sequences for segment #m ($\delta_{x_m}$), one can form/build a radar grid map $R(\delta_{x_m})$, and a "focus" of the map (similarity level of offset sub-maps) is measured by applying a function F:

$$\hat{\delta}_{x_m} = \underset{\delta_{x_m}}{\arg\min}\left(F\left(R(\delta_{x_m})\right) + \lambda \left|\frac{1}{N_m}\sum_{i=1}^{N_m}\delta_x(i; m)\right|\right) \quad (1)$$

In some embodiments, the function F may correspond to the entropy or some other equivalent function providing a quantified value of the similarity level. Moreover, $\lambda$ is a tunable parameter that dictates how hard the predefined constraint ($\Sigma_{i=1}^{N_m} \delta_x(i; m) \approx 0$) should be enforced. For example, $\lambda$ may be set to a large value when $N_m$ is large.

Furthermore, the above formulated optimization problem may be expanded so to optimize over multiple segments. Moreover, the expanded optimization problem may enforce another predefined constraint $\delta_x(i; m) \approx \delta_x(i; m+1) \approx \delta_x(i; m-1)$. That is, the variation of longitudinal errors over adjacent segments for a given pose sequence (i.e., for positioning data reports originating from the same passage) shall be small (e.g., below a predefined threshold value).

Moreover, instead of measuring an entropy, one may consider the magnitude of edges in the radar grid map $R(\delta_{x_m})$. Thus, in some embodiments the similarity level of the formed sub-map representations within the common segment comprises a magnitude of edges within the formed sub-map representations and wherein the numerical optimization is configured so to maximize the magnitude of edges. A radar map may in the present context be understood as a radar road signature, or a radar map can be understood as the perception of the surrounding environment of the vehicle from a radar device's perspective.

Still further, the localization system of each vehicle 24a, 24b and any associated localization algorithm may be configured to produce estimates of the uncertainty of the longitudinal positions. Thus, in some embodiments, the control circuitry 21 is configured to include these uncertainties in the optimization problem. For example, positioning data associated with high uncertainties may be weighted differently than positioning data associated with low uncertainties.

Moving on, once the longitudinal error for each obtained longitudinal position within each segment has been estimated, a new plurality of longitudinal positions of each road vehicle 24a, 24b for each passage is determined by the control circuitry 21. The new plurality of longitudinal positions are formed by applying the estimated longitudinal error on each corresponding obtained longitudinal position.

Further, the control circuitry 21 is configured to apply the determined new plurality of longitudinal positions on associated sensor data in order to generate a first layer of a map representation of the surrounding environment along the road portion. A map layer may be understood as a representation of a geographic area based on a specific data set. For example, one layer may be a map representation of a geographic area based on radar sensor data, another layer may be a map representation of that geographic area based on Lidar sensor data, while yet another layer may be a map representation of that geographic area based on image data from one or more cameras.

Figure 3:
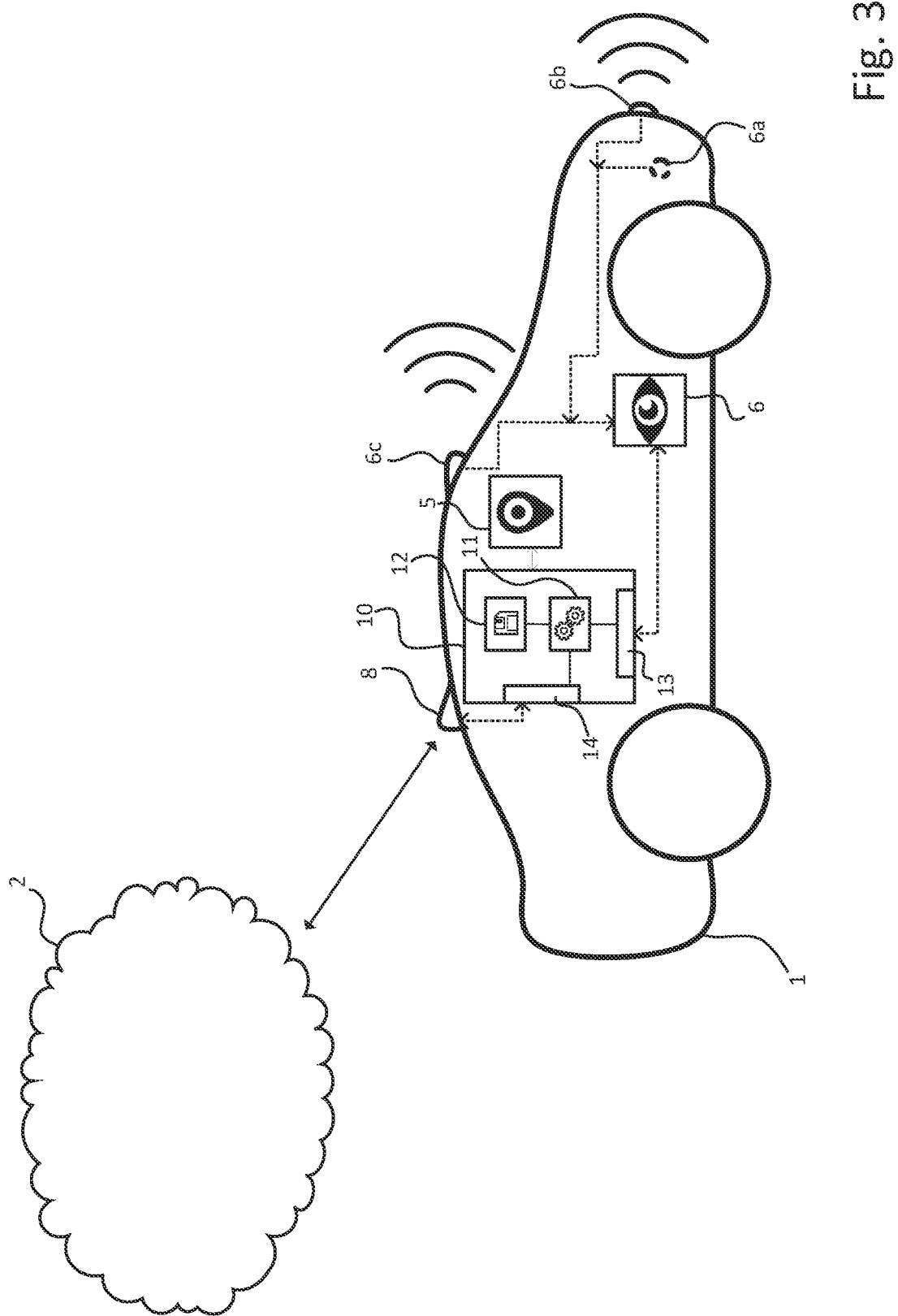
FIG. 3 is a side-view of a vehicle comprising a control system having an automated driving module configured to obtain map data from a control system depicted in FIG. 2.

FIG. 3 is a side-view of a vehicle comprising a vehicle control system 10 having an automated driving module configured to obtain map data from a control system depicted in FIG. 2. The vehicle 1 further comprises a perception system 6 and a localization system 5. A perception system 6 is in the present context to be understood as a system responsible for acquiring raw sensor data from on sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. The vehicle may further comprise at least one of an Inertial Measurement Unit (IMU) and a wheel speed sensor to aid the localization system.

The automated (semi- or fully automated) driving module comprises one or more processors 11, a memory 12, a sensor interface 13 and a communication interface 14. The processor(s) 11 may also be referred to as a control circuit 11 or control circuitry 11. The control circuitry 11 is configured to realize the functionality of the automated driving module, and more specifically to execute instructions stored in the memory 12 to perform a method for controlling at least one of a steering angle, an acceleration and a brake actuation in order to manoeuvre the vehicle 1 as described in the following. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described in the following. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is configured to obtain map data from a control system (e.g., ref. 20 in FIG. 2) according to any one of the embodiments discussed in the foregoing. The map data comprises the first layer of the map representation of the surrounding environment along a road portion upon which the vehicle 1 is traveling. The map data may be obtained directly from the external control system or via a sub-system of the vehicle 1 such as, e.g., the localization system 5 of the vehicle 1.

Further, the control circuitry 11 is configured to generate a signal in order to control at least one of a steering angle, an acceleration and a brake actuation in order to manoeuvre the vehicle 1 based on a comparison between generated sensor data and the obtained map data when the vehicle 1 is traveling along the road portion. Naturally, the control circuitry may be configured to obtain or read the sensor data generated by one or more sensors 6a, 6b, 6c of the perception system. Accordingly, the vehicle 1 is capable of autonomous or semi-autonomous navigation based on radar maps and real-time radar data is provided. This is enabled by the high-precision radar maps which may be generated by means of the methods and control systems (e.g., ref. 20 FIG. 2) discussed in the foregoing.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11, 21 (associated with the control systems 10, 20) may be or include any number of hardware components for conducting data or signal processing or for executing computer code stored in memory 12, 22. The systems 10, 20 have an associated memory 12, and the memory 12, 22 may be one or more devices for storing data and/or computer code for completing or facilitating the various processes described in the present description. The memory may include volatile memory or non-volatile memory. The memory 12, 22 may include database components, object code components, script components, or any other type of information structure for supporting the various activities of the present description. According to an exemplary embodiment, any distributed or local memory device may be utilized with the systems and methods of this description. According to an exemplary embodiment the memory 12, 22 is communicably connected to respective the processor 21, 22 (e.g., via a circuit or any other wired, wireless, or network connection) and includes computer code for executing one or more processes described herein.

It should be appreciated that the sensor interface 13 of the vehicle control system may also provide the possibility to acquire sensor data directly or via dedicated sensor control circuitry 6 in the vehicle 1. The communication/antenna interface 14 may further provide the possibility to send output to a remote location 2 (e.g., remote operator or control centre) by means of the antenna 8. Moreover, some sensors in the vehicle may communicate with the control system 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of determining the new plurality of (longitudinal) positions and applying the new plurality of (longitudinal) positions need not be two separate distinct steps. In some embodiments, the estimated errors are directly applied to the "associated sensor data" wherefore there is no distinct step of "determining a new plurality of (longitudinal) positions". Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

What is claimed is:

1. A method for generating and updating digital maps using a plurality of passages along a road portion by at least one road vehicle, each road vehicle comprising a perception system having at least one sensor configured to monitor a surrounding environment of the vehicle, the method comprising:

obtaining positioning data and sensor data of each passage from the at least one road vehicle, wherein the positioning data comprises a plurality of longitudinal positions of each passage within a plurality of segments of the road portion, and the sensor data comprises information about a surrounding environment of each road vehicle at each longitudinal position;

forming a sub-map representation of the surrounding environment at each obtained longitudinal position based on the obtained sensor data;

estimating a longitudinal error for each obtained longitudinal position within each segment by performing a numerical optimization of the longitudinal error of each obtained longitudinal position within a common segment based on a similarity level of the formed sub-map representations from the common segment;

determining a new plurality of longitudinal positions of each road vehicle for each passage by applying the estimated longitudinal error on each corresponding obtained longitudinal position; and applying the determined new plurality of longitudinal positions on associated sensor data in order to generate a first layer of a map representation of the surrounding environment along the road portion.

2. The method according to claim 1, wherein the similarity level of the formed sub-map representations within the common segment comprises an entropy function and wherein the numerical optimization is configured so to minimize the entropy function.

3. The method according to claim 1, wherein the similarity level of the formed sub-map representations within the common segment comprises a magnitude of edges within the formed sub-map representations and wherein the numerical optimization is configured so to maximize the magnitude of edges.

4. The method according to claim 1, wherein the numerical optimization is further based on a condition defining that a sum of longitudinal errors from the plurality of passages within the common segment is approximately zero such that solutions of the numerical optimization in which the longitudinal errors from the plurality of passages within the common segment diverges away from zero are associated with an increasing cost factor.

5. The method according to claim 1, wherein the numerical optimization is further based on a further condition defining that the longitudinal error within a single segment of one passage is the same for all of the obtained longitudinal positions within the single segment of that passage.

6. The method according to claim 1, wherein the sensor data comprises radar sensor data obtained from one or more radar sensors of the plurality of road vehicles, and wherein the sub-map representations are radar map representations formed based on the radar sensor data.

7. The method according to claim 1, wherein the positioning data comprises a plurality of longitudinal positions of each vehicle as determined by a consumer-grade localization system of each road vehicle.

8. The method according to claim 1, wherein the numerical optimization is further based on a further condition that a variation of the longitudinal error of adjacent segments of one passage is approximately zero such that solutions of the numerical optimization in which the variation of the longitudinal error of adjacent segments of one passage diverges away from zero are associated with an increasing cost factor.

9. The method according to claim 1, further comprising: defining the plurality of segments of the road portion.

10. The method according to claim 1, wherein the sensor data further comprises image sensor data obtained from one or more image sensors of each road vehicle, the method further comprising:

applying the new plurality of longitudinal positions on the associated image sensor data in order to generate a second layer of a map representation of the surrounding environment along the road portion.

11. A non-transitory computer-readable storage medium storing one or more instructions configured to be executed by one or more processors of a processing system, the one or more instructions for performing a method for generating and updating digital maps using a plurality of passages along a road portion by at least one road vehicle, each road vehicle comprising a perception system having at least one sensor configured to monitor a surrounding environment of the vehicle, the method comprising:

obtaining positioning data and sensor data of each passage from the at least one road vehicle, wherein the positioning data comprises a plurality of longitudinal positions of each passage within a plurality of segments of the road portion, and the sensor data comprises information about a surrounding environment of each road vehicle at each longitudinal position;

forming a sub-map representation of the surrounding environment at each obtained longitudinal position based on the obtained sensor data;

estimating a longitudinal error for each obtained longitudinal position within each segment by performing a numerical optimization of the longitudinal error of each obtained longitudinal position within a common segment based on a similarity level of the formed sub-map representations from the common segment;

determining a new plurality of longitudinal positions of each road vehicle for each passage by applying the estimated longitudinal error on each corresponding obtained longitudinal position; and applying the determined new plurality of longitudinal positions on associated sensor data in order to generate a first layer of a map representation of the surrounding environment along the road portion.

12. A control system for generating and updating digital maps using a plurality of passages along a road portion by at least one road vehicle, each road vehicle comprising a perception system having at least one sensor configured to monitor a surrounding environment of the road vehicle, the control system comprising control circuitry configured to:

obtain positioning data and sensor data of each passage from the at least one road vehicle, wherein the positioning data comprises a plurality of longitudinal positions of each passage within a plurality of segments of the road portion, and the sensor data comprises information about a surrounding environment of each road vehicle at each longitudinal position;

form a sub-map representation of the surrounding environment at each obtained longitudinal position based on the obtained sensor data;

estimate a longitudinal error for each obtained longitudinal position within each segment by performing a numerical optimization of the longitudinal error of each obtained longitudinal position within a common segment based on a similarity level of the formed sub-map representations from the common segment;

determine a new plurality of longitudinal positions of each road vehicle for each passage by applying the estimated longitudinal error on each corresponding obtained longitudinal position; and apply the determined new plurality of longitudinal positions on associated sensor data in order to generate a first layer of a map representation of the surrounding environment along the road portion.

13. The control system according to claim 12, wherein the sensor data further comprises image sensor data obtained from one or more image sensors of the each road vehicle, and wherein the control circuitry is further configured to:

apply the new plurality of longitudinal positions on associated image sensor data in order to generate a second layer of a map representation of the surrounding environment along the road portion.

14. A vehicle comprising:
a perception system having at least one sensor device for generating sensor data comprising information about a surrounding environment of the vehicle;
a vehicle control system comprising an automated driving module configured to:
obtain map data from a control system according to claim 13, wherein the map data comprises the first layer of the map representation of the surrounding environment along the road portion;
generate a signal for controlling at least one of a steering angle, an acceleration and a brake actuation in order to manoeuvre the vehicle based on a comparison between generated sensor data and the obtained map data when the vehicle is traveling along the road portion.

\* \* \* \* \*